United States Patent [19]

Marzolf et al.

[11] Patent Number: 5,629,613
[45] Date of Patent: May 13, 1997

[54] CMOS VOLTAGE REGULATOR

[75] Inventors: Philip R. Marzolf, Campbell; Alan C. Rogers, Palo Alto, both of Calif.

[73] Assignee: Sun Microsystems, Inc., Mt. View, Calif.

[21] Appl. No.: 317,897

[22] Filed: Oct. 4, 1994

[51] Int. Cl.$^6$ .................................................. G05F 3/26
[52] U.S. Cl. ................................. 323/315; 323/313
[58] Field of Search ................................. 323/315, 314, 323/311, 313; 324/769

[56] References Cited

U.S. PATENT DOCUMENTS

| | | | |
|---|---|---|---|
| 4,839,535 | 6/1989 | Miller | 307/296 |
| 5,083,079 | 1/1992 | Plants | 323/313 |
| 5,336,986 | 8/1994 | Allman | 323/268 |
| 5,426,375 | 6/1995 | Roy et al. | 324/769 |

*Primary Examiner*—Peter S. Wong
*Assistant Examiner*—Rajnikant B. Patel
*Attorney, Agent, or Firm*—Steven F. Caserza; Flehr, Hohbach, Test, Albritton & Herbert

[57] ABSTRACT

In accordance with the teachings of this invention, a novel voltage regulator is taught which is capable of being formed solely of MOS devices. This eliminates the need to utilize off chip components to form a stand-alone voltage regulator, and avoid the process complexities and increased cost associated with BICMOS fabrication processes.

16 Claims, 3 Drawing Sheets

CMOS VOLTAGE REGULATOR

BACKGROUND OF THE INVENTION

1. Field of Invention

This invention pertains to electronic circuits, and more particularly to a voltage regulator fabricated utilizing only MOS transistors.

2. Description of Prior Art

In electronic circuits, it is often desired to provide a voltage source which is well regulated in order to provide a stable, relatively unvarying voltage source. In certain instances, this is desired because the power supply voltage may vary, for example under load or due to temperature changes, while a particular circuit is desired to be powered by a substantially more stable voltage. For example, in low voltage integrated circuit systems utilizing a supply voltage VDD of 3.3 volts, power supply variation of +/−5% is often the case.

Another problem compounding the difficulty associated with providing a highly stable voltage is the problem of noise. Such noise might be the result of poor filtering in the power source itself, or due to noise imposed on the power supply as it is distributed through a complex electronic system, such as an integrated circuit or a computer system utilizing a plurality of integrated circuits. Such noise problems are often exacerbated by the fact that digital signals operating at a high rate of speed, and therefore switching very rapidly, cause AC noise on the power supply due to transient voltages and rapid changes in power supply load currents. This AC noise is particularly problematic when analog circuitry, which is often highly sensitive to power supply voltage variations, is powered from the same power supply as is digital circuits. For example, in a typical computer system, a significant amount of digital circuitry is utilized, causing AC noise to be superimposed on power supply voltages. Such computer systems might also contain analog circuitry such as phase lock loops which are used for clock deskewing and synchronization with an external clock.

It is known in the past to filter and regulate supply voltages in order to reduce the effects of noise coming from either the power supply itself, or noise signals being superimposed on the distributed power supply voltage from other circuitry, such as rapidly switching digital circuits. Such prior art voltage regulators were formed utilizing bipolar devices, due to several advantages inherent in bipolar fabrication processes. First, in bipolar technology, PN junctions, with a reliable voltage characteristic, are readily available and can be formed so as not to necessarily be tied to either VDD or ground. In contrast, given the typical MOS or CMOS fabrication process, the junctions formed in MOS devices are tied either to VDD or to ground. Furthermore, in bipolar technology, diffused resistors of reasonable tolerances can be formed, unlike MOS processes in which diffused resistors are not normally formed and, if they are, have poor tolerances.

In the prior art, it is known to fabricate devices utilizing a BICMOS process, resulting in a single integrated circuit including bipolar devices and MOS devices. However, this BICMOS process is inherently more complex than either a bipolar or an MOS process, and thus one would not wish to use a BICMOS process unless there were significant needs for both bipolar and MOS circuitry on the same integrated circuit.

It is also known in the prior art to avoid the complexities of BICMOS processing by utilizing an MOS integrated circuit requiring a highly regulated supply voltage, with an external voltage regulator of some sort, such as a bipolar voltage regulator. However, this approach reduces the level of integration, thereby increasing circuit complexity, manufacturing complexity, and ultimate costs.

SUMMARY OF THE INVENTION

In accordance with the teachings of this invention, a novel voltage regulator is taught which is capable of being formed solely of MOS devices. This eliminates the need to utilize off chip components to form a stand-alone voltage regulator, and avoid the process complexities and increased cost associated with BICMOS fabrication processes.

BRIEF DESCRIPTIONS OF THE DRAWINGS

DETAILED DESCRIPTION OF THE INVENTION

Figure 1:
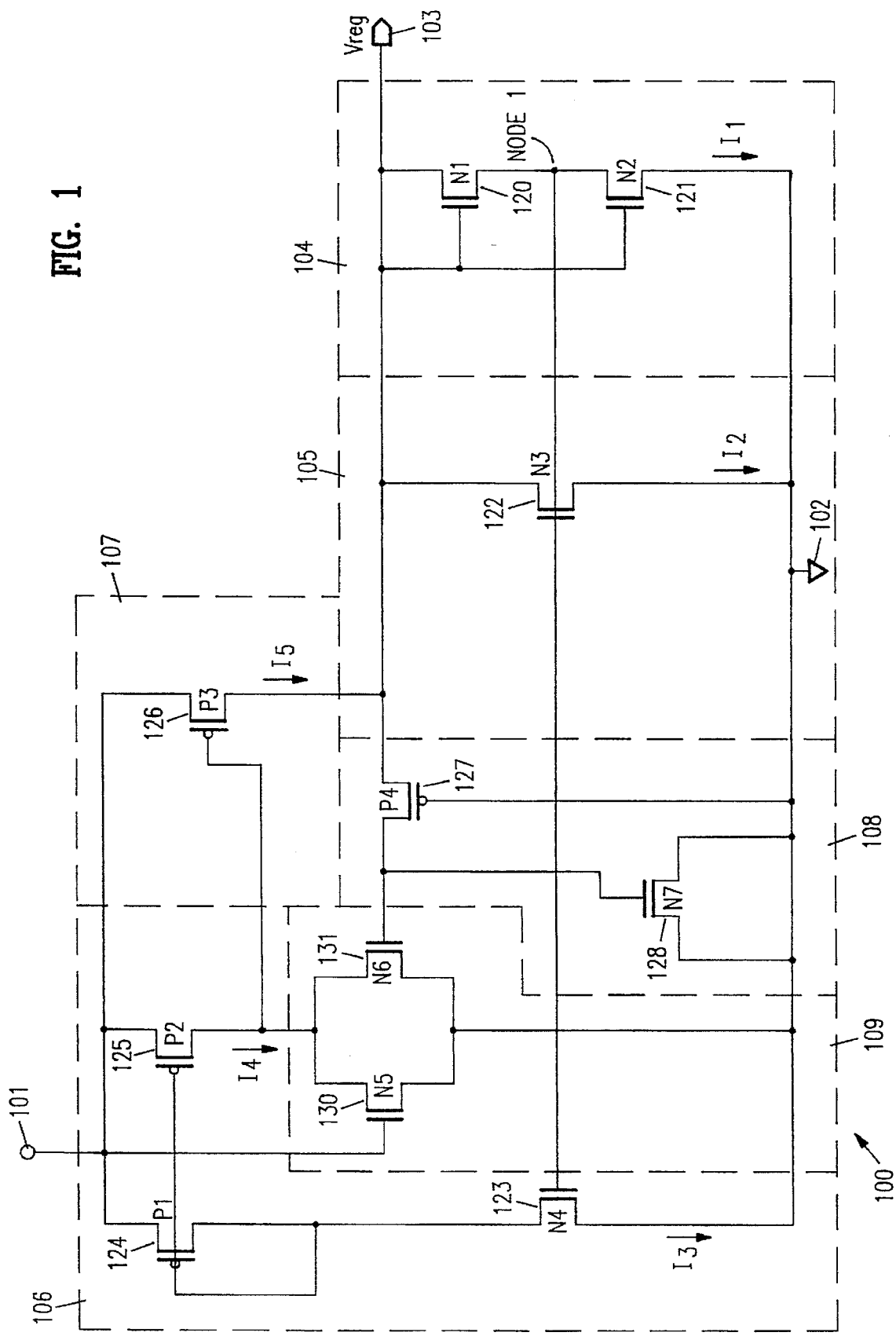
FIG. 1 is a schematic diagram of one embodiment of an MOS voltage regulator constructed in accordance with the teachings of this invention.

FIG. 1 is a schematic diagram depicting one embodiment of an MOS voltage regulator constructed in accordance with the teachings of this invention which, in one embodiment, is formed as part of a computer system, including mass memory, working memory, a CPU, and appropriate I/O circuitry, as a minimum system configuration. Regulator circuit 100 includes VDD input terminal 101, ground terminal 102, and regulated voltage output terminal 103 for providing regulated output voltage Vreg. The embodiment of FIG. 1 includes a number of subcircuits, including voltage dependent load subcircuit 104, current amplifier 105, current mirror 106, and current regulator subcircuit 107. The embodiment of FIG. 1 also includes optional filter network 108 and starter subcircuit 109.

Voltage dependent load subcircuit 104 includes N channel transistors 120 and 121 having current paths connected in series between regulated voltage output terminal 103 and ground 102. The gates of N channel transistors 120 and 121 are connected to regulated voltage output terminal 103, thus causing transistor 120 to function as a load device providing a current I1 to ground as a function of the voltage appearing on regulated voltage output terminal 103. Since the regulative output voltage of Vreg is derived from N channel transistors and 121, Vreg is insensitive to DC variations in VDD applied to terminal 101.

The commonly connected source/drain terminals of transistors 120 and 121 are connected to the gates of N channel transistors 122 and 123. Transistor 122, serving as current amplifier 105, has its current carrying path connected between regulated voltage output terminal 103 and ground, thereby providing a regulating current I2 which is a function of current I1 (and thus Vreg) and the transistor ratios of transistors 120, 121, and 122:

$$I_1 \propto V_{reg} \cdot \left( \frac{W}{L} \right)_{121} \quad (1)$$

$$V_1 = V_{reg} - V_{gs121} \quad (2)$$

$$V_{gs121} = \sqrt{\frac{2I_1}{\mu_o C_{ox}} \left(\frac{L}{W}\right)_{120}} + V_{TN} \qquad (3)$$

so as $I_1$ increases, $V_1$ decreases for a given $V_{reg}$.

$$I_2 = \frac{\mu_o C_{ox}}{2} \left(\frac{W}{L}\right)_{122} (V_1 - V_T)^2 \qquad (4)$$

$$I_2 \propto \left(\frac{W}{L}\right)_{122} \cdot \frac{1}{I_1} \cdot \frac{\left(\frac{W}{L}\right)_{122} \left(\frac{L}{W}\right)_{121}}{V_{reg}} \qquad (5)$$

$$I_2 \propto \left(\frac{W}{L}\right)_{122}, \sqrt{\left(\frac{W}{L}\right)_{120}}, \left(\frac{L}{W}\right)_{121} \qquad (6)$$

where $\left(\frac{W}{L}\right)_n$ = the width-to-length ratio of transistor $n$;

$V_{gs121}$ is the gate-source voltage of transistor 121;

$\mu_o$=electron mobility; and $C_{ox}$=oxide capacitance.

In one embodiment, the ratio of currents I2 to I1 is approximately 8:1. The combination of currents I1 and I2 provide a voltage regulating current which increases with an increase in regulated output voltage Vreg and decreases with a decreasing Vreg, thereby tending to maintain Vreg at a desired level.

Current mirror circuit 106 includes N channel transistor 123 and P channel transistors 124 and 125. One current handling terminal of each of P channel transistors 124 and 125 is coupled to VDD terminal 101, and the other current handling terminal of P channel transistor 124 is coupled to ground terminal 102 through the current handling terminals of N channel transistor 123. The other current handling terminal of P channel transistor 125 is connected to ground terminal 102 through starter circuit 109, which will be explained more fully in a moment. The gates of P channel transistors 124 and 125 are connected in common to the commonly connected current handling terminals of P channel transistor 124 and channel transistor 123. Thus, P channel transistor 124 serves as a load device and, due to the voltage applied to the gate of N channel transistor 123, a current I3 flows from VDD terminal 101 to ground through transistors 124 and 123, which is a mirrored version of current I1 such that $$I_3 = I_2 \left(\frac{W}{L}\right)_{123} \left(\frac{L}{W}\right)_{122} \qquad (8)$$

This current I3 is mirrored as current I4 through P channel transistor 125 according to equation (9):

$$I_4 = I_3 \left(\frac{W}{L}\right)_{125} \left(\frac{L}{W}\right)_{124} \qquad (9)$$

With current I4 flowing through P channel transistor 125, gate bias is provided to the gate of P channel transistor 126 serving as regulator subcircuit 107. Transistor 126 has one current handling terminal connected to VDD terminal 101, and its other current handling terminal connected to output terminal 103, and supplies a current I5 to output terminal 103 according to equation (10):

$$I_5 \propto \left(\frac{W}{L}\right)_{126} \frac{1}{I_4} \qquad (10)$$

In operation, when the output voltage on output terminal 103 increases above the desired regulated voltage, current I1 increases, causing I2 to increase, thereby tending to decrease the regulated output voltage. At the same time, mirrored current I3 increases, causing an increase in mirrored current I4 which in turn increases the voltage applied to the gate of transistor 126, thereby decreasing current I5 and thus decreasing regulated output voltage Vreg applied to terminal 103.

Conversely, when the output voltage Vreg on output terminal 103 decreases below the desired regulated voltage, current I1 decreases, causing I2 to decrease, thereby tending to increase the regulated output voltage. At the same time, mirrored current I3 decreases, causing a decrease in mirrored current I4 which in turn decreases the voltage applied to the gate of transistor 126, thereby increasing current I5 and thus increasing regulated output voltage Vreg applied to terminal 103.

P channel transistor 126 provides the necessary output current for output terminal 103 such that:

$$I_{out} = I_5 - I_1 - I_2 \qquad (11)$$

Transistor 126 maintains high power supply rejection at frequencies up to and exceeding 200 Mhz, because it is large and functions as a current source whose output current doesn't change with changes in VDD. The sources of P channel transistors 124, 125, and 126 are all common mode, thus lessening the effect of any variation and power supply voltage VDD applied to terminal 101 on the regulated output voltage Vreg, as any such variation in VDD will effect transistors 124, 125, and 126 in a similar fashion. Furthermore, currents I4 and I5 are derived by current I3, which is mirrored from current I1, which in turn is not derived from the power supply voltage VDD, but rather derived solely from N channel transistors 120 and 121, thus providing that the entire circuit 100 has a high power supply rejection.

In the embodiment shown in FIG. 1, starter subcircuit 109 is utilized in order to ensure proper and prompt operation of circuit 100 on powerup. Starter subcircuit 109 includes cold start N channel transistor 130 having its current carrying path connected between transistor 125 and ground, and having its gate connected to VDD terminal 101. Upon power up, N channel transistor 130 turns on, providing a path for current I4 between P channel transistor 125 and ground. Starter subcircuit 109 also includes N channel transistor 131 having its current carrying terminals connected in parallel with those of transistor 130, but having its control gate coupled to output terminal 103. When voltage Vreg appears due to current I5 on output terminal 103, transistor 131 is turned on, thereby carrying a portion of current I4 from transistor 125 to ground. In this embodiment, transistor 131 is sized to, once turned on after power up, carry most of current I4, rather than transistor 130. In one embodiment, transistor 131 carries approximately 80% of current I4 once circuit 100 is powered up. By providing that transistor 131 carries most of current I4, current I4 is made relatively insensitive to variations in power supply voltage VDD and allows current I4 to be controlled by the gate drive applied to transistor 131.

When the voltage on output terminal 103 increases above a desired regulated voltage, transistor 131 receives increased gate drive, increasing current I4, and thus decreasing the voltage on the gate of P channel transistor 126, increasing current I5, and thus undesirably increasing voltage Vreg on output terminal 103. Conversely, when the voltage on output terminal 103 decreases below a desired regulated voltage, transistor 131 receives decreased gate drive, decreasing current I4, and thus increasing the voltage on the gate of P channel transistor 126, increasing current I5, and thus undesirably decreasing voltage Vreg on output terminal 103. In the embodiment of FIG. 1, the gate drive applied to transistor 131 is filtered by subcircuit 108, in order to reduce the effect of this slight positive feedback inherently and undesirably provided by transistors 125, 126, and 131. In this embodiment, subcircuit 108 includes P channel transistor 127 having its current carrying path connected between output terminal 103 and the gate of transistor 131, and its control gate connected to ground. Transistor 127 serves as a resistor, since it is AC in the linear mode of operation. In this embodiment, a capacitor is formed by transistor 128, having its source and drain terminals connected to ground, and its control gate connected to the gate of transistor 131. Thus, filter subcircuit 108 in this embodiment includes resistor 127 and capacitor 128 providing RC filtering of the control voltage applied to the gate of transistor 131. Other types of resistance and capacitance can be utilized, as well as other types of filtering, in alternative embodiments which include this filter.

Thus, the embodiment of FIG. 1 provides a voltage regulator providing excellent voltage regulation and noise immunity, while being fabricated utilizing only MOS components, thereby allowing its complete integration in a CMOS circuit, without the need for external voltage regulation circuitry or bipolar components, and thus a more complex and expensive BICMOS fabrication process.

Figure 2:
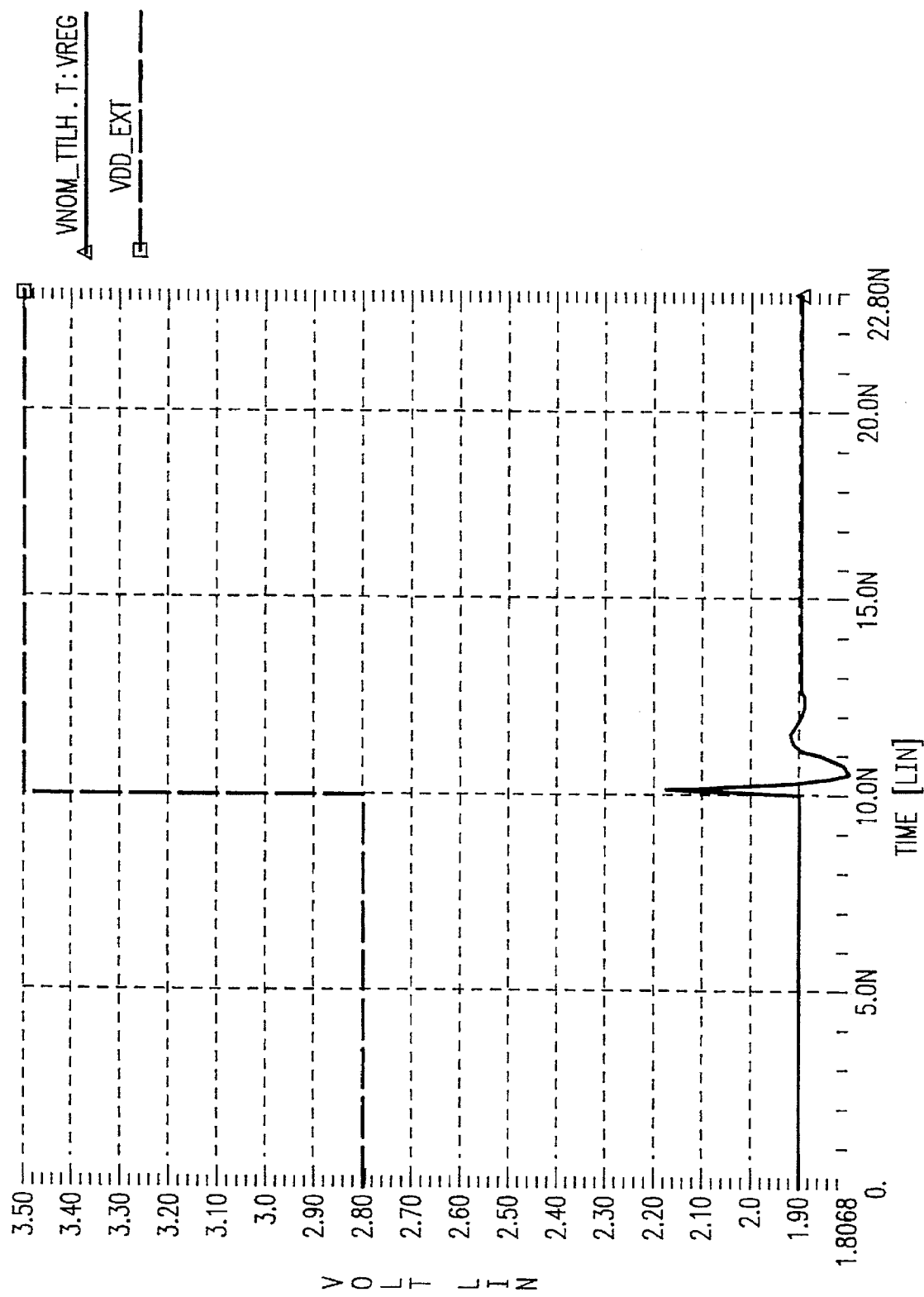
FIG. 2 is a graph depicting the voltage regulation provided by a voltage regulator constructed in accordance with the teachings of this invention.

FIG. 2 is a graph depicting output voltage Vreg on terminal 103 as measured from a time $T_0$ when a 700 mVolt step is superimposed on supply voltage VDD.

Figure 3:
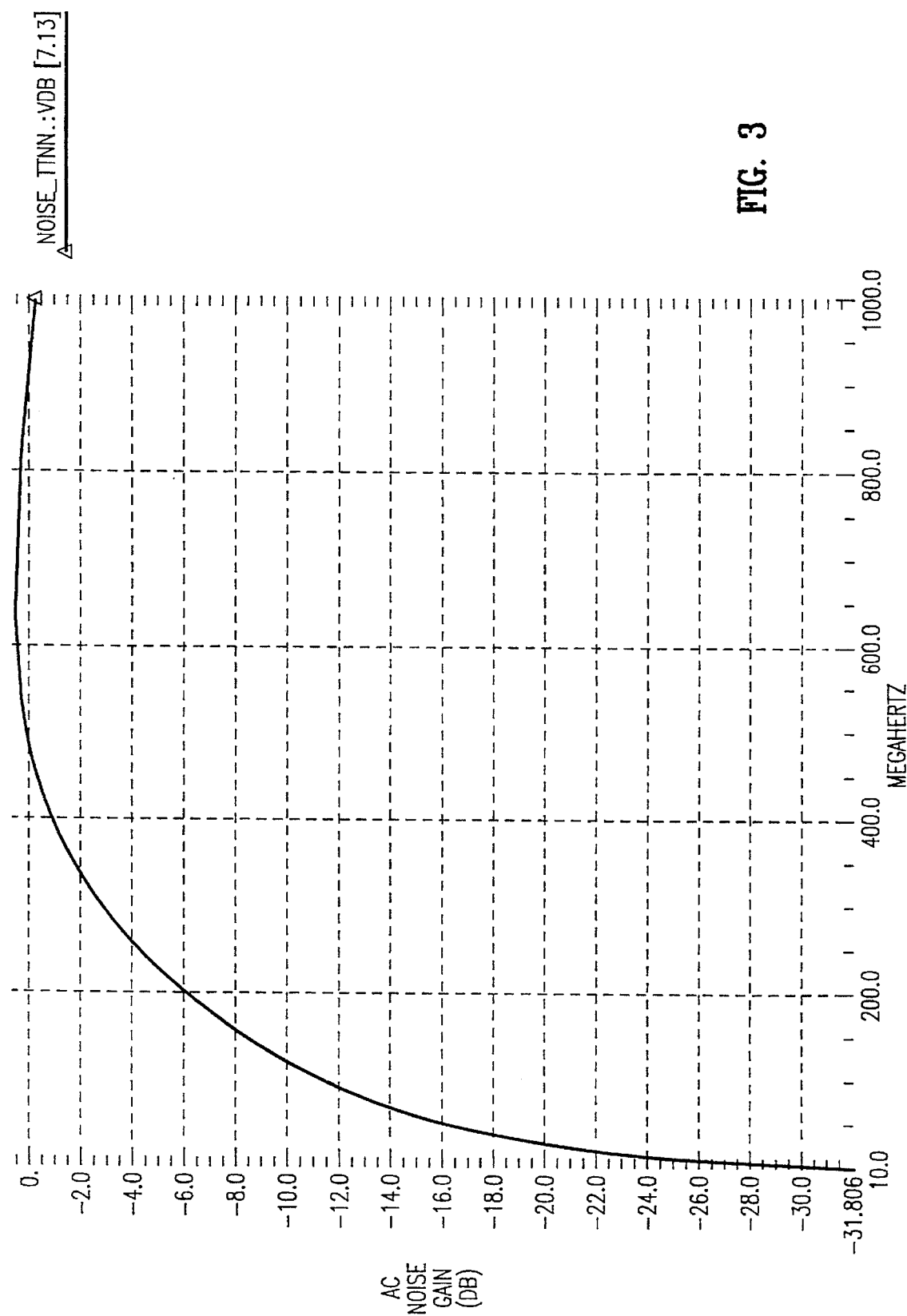
FIG. 3 is an AC plot depicting the excellent AC noise rejection provided by this invention.

FIG. 3 is a graph depicting AC noise gain, in dB versus frequency in Megahertz, showing a significant AC noise attenuation up to about 400 Mhz, utilizing one embodiment of the voltage regulator of this invention.

What is claimed:

1. A CMOS voltage regulator comprising:
   a first supply terminal for receiving a first supply voltage;
   a second supply terminal for receiving a second supply voltage;
   an output terminal for providing a regulated output voltage;
   a first MOS circuit providing a first current path coupled between said output terminal and said second supply terminal, which develops a first current as a function of said regulated output voltage, said first MOS circuit comprising a first and a second MOS transistor having their current carrying paths coupled in series between said second voltage supply terminal and said output terminal, and a common node coupled to said current mirror circuitry;
   a second MOS circuit providing a second current path coupled between said first supply terminal and said output terminal, which provides a second current from said first supply terminal to said output terminal as a function of said first current; and
   MOS current mirroring circuitry responsive to said first current to provide control of said second current.

2. A voltage regulator as in claim 1 wherein said first MOS circuit comprises at least one MOS transistor having its current carrying terminals coupled between said second supply voltage terminal and said output terminal.

3. A voltage regulator as in claim 1 wherein said first and second MOS transistors have their gates coupled in common to said output terminal.

4. A voltage regulator as in claim 1 which further comprises a third MOS transistor having current carrying path coupled between said second voltage supply terminal and said output terminal, and a control terminal coupled to said common node of said first and second MOS transistors.

5. A voltage regulator as in claim 4 wherein said third MOS transistor is sized to carry a larger current, mirrored from said first current.

6. A voltage regulator as in claim 4 wherein said current mirror circuitry comprises a fourth MOS transistor having its current carrying path coupled between said first and second supply voltage terminals, and a control terminal coupled to said common node of said first and second MOS transistors.

7. A voltage regulator as in claim 6 wherein said fourth MOS transistor is coupled to said first supply voltage terminal through a fifth MOS transistor, and said current mirror circuit further comprises a sixth MOS transistor which mirrors the current in said fifth MOS transistor in order to provide a control voltage to control said second current path.

8. A voltage regulator as in claim 7 wherein said second current path comprises a seventh MOS transistor having its current carrying leads coupled between said first supply voltage terminal and said output terminal, and a control gate coupled to receive said control voltage from said sixth MOS transistor.

9. A voltage regulator as in claim 8 wherein said sixth MOS transistor is coupled to said second supply voltage terminal via a circuit which receives feedback from said output terminal.

10. A voltage regulator as in claim 9 wherein said circuit which receives feedback comprises an eighth MOS transistor having its current carrying path coupled between said sixth MOS transistor and said second supply voltage terminal, and a control terminal coupled to said output terminal.

11. A voltage regulator as in claim 10 which further comprises a ninth MOS transistor having a current carrying path coupled between said second voltage supply terminal and said sixth MOS transistor, and a control terminal coupled to said first voltage supply terminal.

12. A voltage regulator as in claim 10 wherein said control terminal of said eighth MOS transistor is coupled to said output terminal through a filter network.

13. A voltage regulator as in claim 12 wherein said filter network comprises an RC low pass filter network.

14. A voltage regulator as in claim 13 wherein said RC filter network comprises an MOS device coupled between said output terminal and said control gate of said eighth MOS transistor.

15. A voltage regulator as in claim 14 wherein said RC filter further comprises an MOS device serving as a capacitance coupled to said control gate of said eighth MOS transistor.

16. A voltage regulator as in claim 15 wherein said MOS device comprises at least one source/drain region coupled to a supply voltage terminal and a control gate coupled to said control gate of said eighth MOS transistor.

* * * * *